Figure 1:
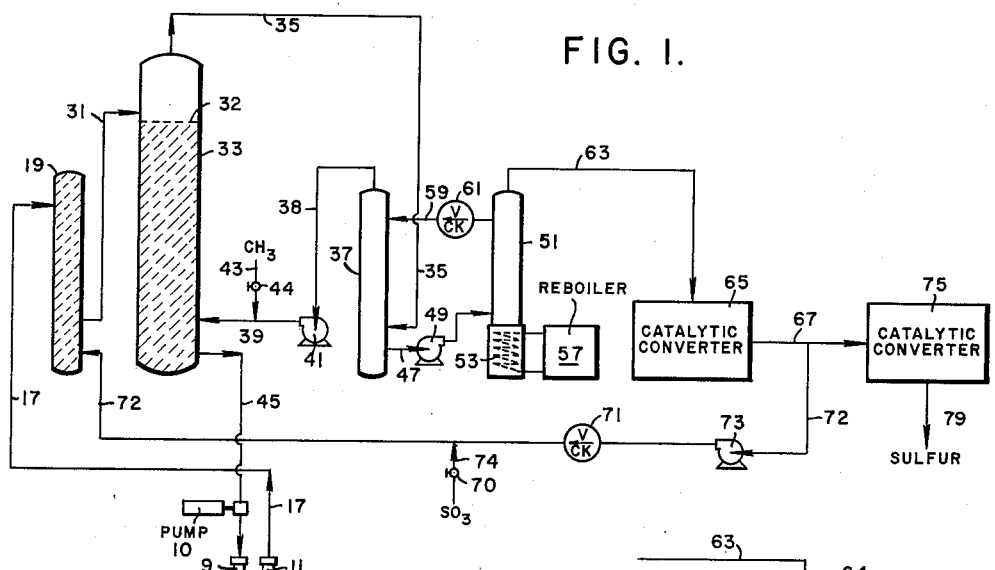
Figure 1:
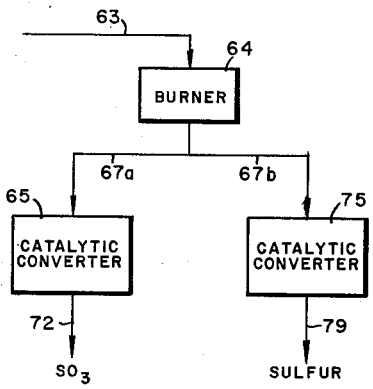

Nov. 26, 1963  W. J. FRANK  3,111,983
REMOVAL OF HYDROGEN SULFIDE FROM WATER
Filed Jan. 25, 1962

INVENTOR.
WALLACE J. FRANK,
BY *John B. Davidson*
ATTORNEY.

United States Patent Office 3,111,983
Patented Nov. 26, 1963

3,111,983
REMOVAL OF HYDROGEN SULFIDE FROM
WATER
Wallace J. Frank, Midland, Tex., assignor, by mesne assignments, to Jersey Production Research Company, Tulsa, Okla., a corporation of Delaware
Filed Jan. 25, 1962, Ser. No. 168,755
12 Claims. (Cl. 166—8)

This invention relates to the removal of hydrogen sulfide from a stream of hydrogen sulfide-contaminated water. In a specific aspect of the invention, it relates to a method of treating a hydrogen sulfide-contaminated water stream derived from a subsurface earth formation for reinjection into the same or another subsurface earth formation without aerating or otherwise absorbing oxygen into the water stream.

There are many circumstances under which it is desirable to remove hydrogen sulfide from a stream of hydrogen sulfide-contaminated water. For example, in oil and gas recovery, often it is desirable to waterflood a particular field in connection with secondary recovery operations. Oftentimes the only source of water available for injection into a formation for waterflooding the formation is contaminated with hydrogen sulfide gas. Injection of this water into a productive formation would result in the produced oil and gas being contaminated with hydrogen sulfide. In addition to presenting or complicating corrosion problems, a small percentage of hydrogen sulfide in natural gas produced from a field will result in the gas being unsuitable for many commercial purposes. Furthermore, when the water is brought to the earth's surface prior to reinjection, the pressure under which the water is maintained is drastically reduced. As a result, gases such as carbon dioxide are evolved therefrom. The effect of the removal of such gases from the water is to increase the pH of the water. This causes the precipitation of many compounds normally entrained in the water which are highly insoluble in the higher pH range. Examples of such compounds are the hydroxides of iron and aluminum.

Various processes have been devised or suggested for the purpose of avoiding precipitation of iron and aluminum compounds in subsurface formations as a result of pH increase of the water, and for removal of hydrogen sulfide from water prior to injection into a productive earth formation. Such processes have proved more or less unsatisfactory in many locations. For example, it has been suggested to aerate the water and then subject the water to filtering operations for the purpose of removing the iron and aluminum compounds precipitated by the aeration. Even though attempts are made to remove oxygen thus entrained in the water, inevitably a certain amount of oxygen is injected with the water into the formation to complicate waterflood operations as the result of chemical reactions, resulting in plugging of the formations. As another example, it has been known that subjetcion of hydrogen sulfide-contaminated fluids to treatment with sulfur dioxide gas will result in the precipitation of free sulfur by virtue of the reaction $$SO_2 + 2H_2S = 3S + H_2O$$

However, the sulfur thus produced is in the form of "flowers of sulfur," which is difficult and expensive to remove from a large volume stream of water. Furthermore, not all of the hydrogen sulfide will react with the sulfur dioxide so that a certain amount of hydrogen sulfide will be carried over into the fluid available for reinjection into the earth.

Typical of the prior art are U.S. Patents No. 2,398,123—Sowers and No. 2,875,836—Stiff et al.

In accordance with the teachings of the present invention, a stream of water is contacted in an oxygen-free environment with sulfur trioxide and with a hydrogen sulfide-absorbing gas, preferably a hydrocarbon gas, hydrogen, or carbon dioxide. The sulfur trioxide lowers the pH of the water by reaction with the water molecules to form sulfuric acid, and makes easier the removal of the hydrogen sulfide by the hydrogen sulfide-absorbing gas. The hydrogen sulfide is separated from the absorbing gas, and the absorbing gas is reinjected into the stream of water to further remove hydrogen sulfide therefrom. The separated hydrogen sulfide gas is thereupon converted into sulfur trioxide for reinjection into the water stream as described above. A portion of the separated hydrogen sulfide may be catalytically converted into elemental sulfur.

Figure 2:
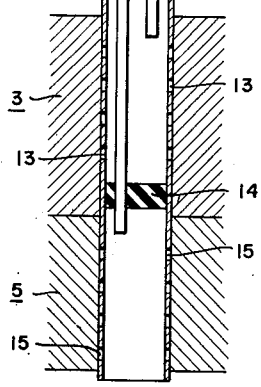

Objects and features of the invention not apparent from the above discussion will become evident upon consideration of the following more detailed description thereof taken in connection with the accompanying drawing, wherein:

FIG. 1 is a diagrammatic view of a system for carrying out the method of the present invention; and FIG. 2 is a diagrammatic view of a modification of a portion of the system of FIG. 1.

Referring now to the drawing, reference numeral 1 designates generally the surface of the earth. A multiple completed well is shown having a casing 7 penetrating an earth formation 5 on which waterflood operations are to be conducted, and an earth formation 3 from which water is to be drawn for flooding formation 5. Perforations 13 provide fluid communication between formation 3 and the interior of casing 11, while perforations 15 provide fluid communication between earth formation 5 and the casing interior. Tubing strings 9 and 11 are suspended from a conventional wellhead and extend to the level of earth formations 3 and 5. A production packer 14 between flow tubing 9 and casing 7 is used to prevent direct fluid communication between formations 3 and 5 through the interior of casing 7. Manifestly, the use of separate wells to produce water from formation 3 and to reinject the water into formation 5 is equivalent to the installation shown in the drawing.

Water from flow tubing 11 is injected into the upper end of contacting tower 19 by way of flow line 17. Sulfur trioxide is injected into the lower end of tower 19 through line 72. A check valve 71 may be incorporated in line 72 to prevent water in tower 19 from flowing into line 72. Water from the lower end of tower 19 is injected into the upper end of tower 33 through flow line 31. Both tower 19 and tower 33 may be types well known to the art, such as are manufactured by the National Tank Company of Tulsa, Oklahoma. A hydrogen sulfide absorbing gas is injected into the lower end of tower 33 through line 39. Water from tower 33 is injected into flow tubing 9 through a line 45 having a pressurizing pump 10 therein.

It is important to note that a sealed system is provided for the flow of water such that oxygen from the atmosphere cannot contact the water and be absorbed thereby. While the liquid level 32 in tower 33 may be below the injection point of water into the tower from line 31, the space above the water level is filled with a mixture of hydrogen sulfide and a hydrogen sulfide-absorbing gas from line 39.

The upper end of tower 33 is connected to a line 35 such that gases in the upper end of tower 33 may be removed from the tower. Gases flowing through line 35 are injected into the lower end of a tower 37 which, as shown herein, is a part of an amine-type gas desulfurizer which may be of the type described on page 690 of the "Composite Catalog of Oil Field Equipment and Services," 24th Rev. (World Oil, 1960). The absorbing gas is removed from the upper end of tower 37 by way of line 38, which is connected to line 39 by a pump 41. Make-up gas is injected into the system through line 43 controlled by valve 44. The amine, which preferably is monoethanol amine or other H₂S absorbing material, such as amines and glycols known in the art as having this property, is removed from the tower 37 through line 47 having a pump 49 therein, and is injected into a heating tower 51. A reboiler system including a boiler 57 and a heating coil 53 in tower 51 is used for the purpose of heating the absorbing material-hydrogen sulfide mixture injected into the tower. The result is that hydrogen sulfide is evolved from the tower in gaseous form so that substantially uncontaminated absorbing material can be injected from the upper end of tower 51 through line 59 controlled by check valve 61 into tower 37.

Hydrogen sulfide gas evolved from the liquid in tower 51 is removed from the tower 51 through line 63 and injected into a catalytic converter 65. In the catalytic converter 65 the hydrogen sulfide gas is converted into sulfur trioxide. The catalyst in the converter 65 may be platinum, vanadium pentoxide, or other known catalysts adapted to facilitate the oxidation of hydrogen sulfide into sulfur trioxide rather than sulfur dioxide. Alternatively, the hydrogen sulfide can be burned to produce sulfur dioxide and water before injection into catalytic converter 65, the converter 65 thereupon further oxidizing the sulfur dioxide into sulfur trioxide.

The sulfur trioxide produced in converter 65 is removed from the converter and split into two fractions or flow streams. One fraction in line 67 is injected into a catalytic reducing converter 75 wherein it is converted into elemental sulfur, which is drawn from converter 75 through line 79. The second fraction flows through line 67 into line 72 controlled by valve 71 and having a pump 73 therein for injection into tower 19. A separate source of sulfur trioxide is connected to line 72 through line 74 controlled by valve 70. The separate source is for use during start-up operations, and on occasions when insufficient sulfur trioxide may be produced from converter 65, to lower the pH of the water from tower 19 to a sufficiently low value.

The reducing catalyst may be any of a number of commercially available catalysts. A particularly suitable catalyst is natural bauxite that has been activated by heating to 700–750° F. and calcined to a residual content of about 6%.

Alternatively, as shown in FIG. 2, a burner 64 may be used to convert the hydrogen sulfide in line 63 to sulfur dioxide. The sulfur dioxide is divided into two fractions or flow streams, one of which is injected into catalytic converter 65 through line 67a and the other into reducing converter 75 through line 67b. Otherwise, the system is the same as that illustrated in FIG. 1.

Additional valves, pumps, blowers, regulators, etc., other than those shown may be inserted in the system as needed for correct operation of the system.

The system of FIG. 1 is started with all of the valves shown in the schematic diagram open and the pumps operating. Water from formation 3 will flow through tubing string 11, through line 17 into tower 19. Sulfur trioxide from the external source will flow through valve 70, line 74 and line 72 into the lower end of tower 19. Within the tower 19 the sulfur trioxide will combine with the water to form sulfuric acid and decrease the pH of the water. The $SO_3$ contacted water will flow through line 31 into tower 33. The hydrogen sulfied absorbing gas used in the system will be assumed to be a hydrocarbonaceous natural gas such as methane. Methane will be introduced into the system through line 43, valve 44, and line 39 and injected into the lower end of tower 33. The methane will absorb hydrogen sulfide in the water flowing into the tower from line 31 as the methane bubbles up through the water in the tower. Tower 19 may be completely filled with water while the upper end of tower 33 will be filled with methane containing hydrogen sulfide. The combination of methane and hydrogen sulfide will flow through line 35 into tower 37. Monoethanolamine or other absorbing material in tower 37 will absorb the hydrogen sulfide but not the methane so that the methane will evolve out the top of tower 37 and will be pumped through line 38 by pump 41 into line 39 and back into the tower. The hydrogen sulfide and the monoethanolamine will be evolved contaminated by hydrogen sulfide in tower 51. The hydrogen sulfide is converted into sulfur trioxide in catalytic converter 65 and passed partially into converter 75 and partially through line 72 back into the tower 19. After a short period of time, valve 70 may be closed inasmuch as the system normally will produce more than enough sulfur trioxide to supply to pH reducing requirements of the system. Very little methane will be lost in the system so that valve 44 may be closed and then cracked open only enough to supply the methane make-up requirements of the system. Water from the bottom of tower 33 is pumped through line 45 into flow tubing 9 and thence into formation 5.

Preferably, the amount of sulfur trioxide returned through line 72 into tower 19 is sufficient to maintain the pH of the water in tower 19 lower than 7.

The monoethanolamine gas separating system shown in FIG. 1 may be replaced by a system utilizing finely divided iron ore. The iron ore may be regenerated by blowing a reducing agent, such as live steam, therethrough. A fluidized system such as is widely used in refining practice for fluidized catalytic cracking may be used to provide a continual flow of iron ore moving between the gas-separating portion thereof and the regenerating portion thereof. Otherwise, the system will be substantially as shown in FIG. 1.

An advantage of the modification of the invention illustrated in FIG. 2 is that substantially less catalyst will be required to reduce sulfur dioxide flowing into catalytic converter 75 than would be required to reduce sulfur trioxide.

As indicated above, the hydrogen sulfide absorbing gas may be carbon dioxide, hydrogen, a natural gas such as methane, or other gases known to the art. The preferred gas for the system is a hydrocarbonaceous natural gas in view of the fact that such gas is readily available in the field and is probably the most inexpensive gas that can be used.

The catalytic converters 65 and 75 may be types such as are commercially available and manufactured by Graff Engineering Company of Dallas, Texas.

From the above description it is readily apparent that there has been provided an economical method of treating hydrogen sulfide containing water to maintain low pH in the treated water, and to remove substantially all of the hydrogen sulfide contained in the water to be treated. It is further apparent that there is provided a system for accomplishing the above results which has the further advantage of yielding a substantial amount of elemental sulfur which has an appreciable value in the market place. In many installations it will be found that the value of the elemental sulfur produced by the invention is more than enough to pay for the cost of operating the system.

It will be obvious to those skilled in the art that modifications may be made in details of construction, arrangement and procedure without departing from the spirit of the invention. Therefore, the invention is not to be limited except as the prior art and the appended claims may require.

I claim:

1. In a method of sweetening a hydrogen sulfide-contaminated water stream, the improvement comprising:
   in an oxygen-free environment, contacting the stream at a predetermined location therein with sulfur trioxide to lower the pH of the water, and with a gaseous absorbent for hydrogen sulfide to remove the hydrogen sulfide in the water stream;

separating the absorbed hydrogen sulfide from said gaseous absorbent and reinjecting the separated gaseous absorbent into the water stream;

converting at least a portion of the separated hydrogen sulfide into sulfur trioxide; and injecting the sulfur trioxide so converted into said contaminated water stream at said predetermined location.

2. A method of sweetening a hydrogen sulfide-contaminated water stream, comprising:

in an oxygen-free environment, contacting the stream at a predetermined location therein with sulfur trioxide to lower the pH of the water, and with an oxygen-free gaseous absorbent for hydrogen sulfide to remove the hydrogen sulfide in the water;

separating the absorbed hydrogen sulfide from said gaseous absorbent and reinjecting the separated gaseous absorbent into the water stream;

converting a portion of the separated hydrogen sulfide into elemental sulfur, and the remainder of the separated hydrogen sulfide into sulfur trioxide; and injecting the sulfur trioxide so converted into said contaminated water stream at said predetermined location.

3. A method of sweetening a hydrogen sulfide-contaminated water stream, comprising:

at a predetermined location in the water stream, contacting the water stream with sulfur trioxide to lower the pH of the stream;

contacting the sulfur trioxide treated water stream with a hydrogen sulfide-absorbing gas to remove hydrogen sulfide from the water stream;

separating the hydrogen sulfide from the hydrogen sulfide-absorbing gas, and recontacting the sulfur trioxide-treated water stream with the hydrogen sulfide-absorbing gas so separated;

converting a first fraction of the hydrogen sulfide thus separated into sulfur trioxide and the remainder to elemental sulfur; and reinjecting the sulfur trioxide thus converted into the stream of hydrogen sulfide contaminated water at said predetermined location therein.

4. A method of sweetening a hydrogen sulfide-contaminated water stream, comprising:

at a predetermined location in the water stream, contacting the water stream with sulfur trioxide to lower the pH of the stream;

contacting the sulfur trioxide-treated stream with a gaseous absorbent for hydrogen sulfide selected from the group consisting of hydrogen, carbon dioxide, and a hydrocarbon gas to remove hydrogen sulfide from the stream;

separating the gaseous absorbent from the hydrogen sulfide absorbed thereby, and recontacting the sulfur trioxide-treated water stream with the absorbing gas so separated;

converting a first fraction of the hydrogen sulfide so separated to sulfur trioxide, and the remainder of the hydrogen sulfide thus separated to elemental sulfur; and reinjecting the sulfur trioxide thus converted into the stream of hydrogen sulfide-contaminated water at said predetermined location therein.

5. A method of sweetening a hydrogen sulfide-contaminated water stream, comprising:

at a predetermined location in the water stream, contacting the water stream with sulfur trioxide to lower the pH of the stream;

contacting the sulfur trioxide-treated stream with a gaseous absorbent for hydrogen sulfide selected from the group consisting of hydrogen, carbon dioxide, and a hydrocarbon gas to remove hydrogen sulfide from the stream;

oxidizing the separated hydrogen sulfide to form sulfur dioxide, and catalytically converting a first fraction of the sulfur dioxide thus formed into sulfur trioxide, and a second fraction to elemental sulfur; and reinjecting the sulfur trioxide thus converted into the stream of hydrogen sulfide-contaminated water at said predetermined location therein.

6. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrocarbon gas to remove hydrogen sulfide from the stream by absorption into the hydrocarbon gas;

injecting the treated water into a subsurface earth formation;

contacting the hydrocarbon gas-hydrogen sulfide stream with an amine stripping agent to strip hydrogen sulfide from the gas stream;

reinjecting the hydrocarbon gas into the sulfur trioxide-treated water stream;

heating the amine stripping agent to remove hydrogen sulfide therefrom;

oxidizing the hydrogen sulfide removed from the amine stripping agent to form a sulfur trioxide gas stream; and injecting the sulfur trioxide gas stream into the water stream at said predetermined location.

7. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrocarbon gas to remove hydrogen sulfide from the stream by absorption into the hydrocarbon gas;

injecting the treated water into a subsurface earth formation;

contacting the hydrocarbon gas-hydrogen sulfide stream with an amine stripping agent to strip hydrogen sulfide from the gas stream;

reinjecting the hydrocarbon gas into the sulfur trioxide-treated water stream;

heating the amine stripping agent to remove hydrogen sulfide therefrom;

oxidizing the hydrogen sulfide removed from the amine stripping agent to form a sulfur trioxide gas stream, and injecting a portion of the sulfur trioxide gas stream into the water stream at said predetermined location therein; and reducing the remainder of the sulfur trioxide gas stream to elemental sulfur.

8. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrocarbon gas to remove hydrogen sulfide from the stream by absorption into the hydrocarbon gas;

injecting the treated water into a subsurface earth formation;

contacting the hydrocarbon gas-hydrogen sulfide stream with an amine stripping agent to strip hydrogen sulfide from the gas stream;

reinjecting the hydrocarbon gas into the sulfur trioxide-treated water stream;

heating the amine stripping agent to remove hydrogen sulfide therefrom;

oxidizing the hydrogen sulfide removed from the amine stripping agent to form a sulfur trioxide gas stream, and injecting a portion of the sulfur trioxide gas stream into the water stream at said predetermined location therein;

reducing the remainder of the sulfur trioxide gas stream to elemental sulfur; and adjusting the flow rate of the sulfur trioxide gas to maintain the pH of the hydrogen sulfide-contaminated water no higher than 7.

9. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrogen sulfide-absorbing gas to remove hydrogen sulfide from the stream by absorption into the gas, thereby sweetening the water stream;

injecting the sweetened water stream into a subsurface earth formation;

separating the hydrogen sulfide from the hydrogen sulfide-absorbing gas and reinjecting the hydrogen sulfide-absorbing gas into the sulfur trioxide-treated water stream;

oxidizing the separated hydrogen sulfide to form a sulfur dioxide gas stream and a sulfur trioxide gas stream;

injecting the sulfur trioxide gas stream into the water stream at said predetermined location; and reducing the sulfur dioxide gas stream to elemental sulfur.

10. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrogen sulfide-absorbing gas to remove hydrogen sulfide from the stream by absorption into the gas, thereby sweetening the water stream;

injecting the sweetened water stream into a subsurface earth formation;

separating the hydrogen sulfide from the hydrogen sulfide-absorbing gas and reinjecting the hydrogen sulfide-absorbing gas into the sulfur trioxide-treated water stream;

burning the separated hydrogen sulfide gas to form sulfur dioxide gas;

oxidizing a portion of the surfur dioxide gas to form sulfur trioxide and injecting the sulfur trioxide gas thus formed into the water stream at said predetermined location; and reducing the remaining sulfur dioxide gas to elemental sulfur.

11. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrocarbon gas to remove hydrogen sulfide from the stream by absorption into the hydrocarbon gas, thereby sweetening the water stream;

injecting the sweetened water stream into a subsurface earth formation;

contacting the hydrocarbon gas-hydrogen sulfide stream with an amine stripping agent to strip hydrogen sulfide from the gas stream;

reinjecting the hydrocarbon gas into the sulfur trioxide-treated water stream;

heating the amine stripping agent to remove hydrogen sulfide therefrom;

burning the hydrogen sulfide removed from the amine stripping agent to form sulfur dioxide;

oxidizing a portion of the sulfur dioxide thus formed into sulfur trioxide, and injecting the sulfur trioxide thus formed into the water stream at said predetermined location; and reducing the remaining sulfur dioxide to elemental sulfur.

12. In the treatment of a stream of hydrogen sulfide-contaminated water from a subsurface earth formation, the method comprising:

at a predetermined location in the water stream, contacting the water stream with sulfur trioxide to lower the pH of the stream;

contacting the sulfur trioxide-treated stream with a hydrocarbon gas to remove hydrogen sulfide from the stream by absorption into the hydrocarbon gas, thereby sweetening the water stream;

injecting the sweetened water stream into a subsurface earth formation;

contacting the hydrocarbon gas-hydrogen sulfide stream with an amine stripping agent to strip hydrogen sulfide from the gas stream;

reinjecting the hydrocarbon gas into the sulfur trioxide-treated water stream;

heating the amine stripping agent to remove hydrogen sulfide therefrom;

oxidizing the hydrogen sulfide removed from the amine stripping agent to form a sulfur dioxide gas stream and a sulfur trioxide gas stream;

injecting the sulfur trioxide gas stream into the water stream at said predetermined location; and reducing the sulfur dioxide gas in the sulfur dioxide gas stream to elemental sulfur.

References Cited in the file of this patent

UNITED STATES PATENTS

| | | |
|---|---|---|
| 1,964,487 | Smith | June 26, 1934 |
| 2,041,397 | Butterworth | May 19, 1936 |
| 2,809,698 | Bond | Oct. 15, 1957 |